United States Patent
Reimann

(10) Patent No.: US 10,782,312 B2
(45) Date of Patent: Sep. 22, 2020

(54) THREE-AXIS ROTATIONAL ACCELERATION SENSOR

(71) Applicant: Robert Bosch GmbH, Stuttgart (DE)

(72) Inventor: Mathias Reimann, Stuttgart-Sued (DE)

(73) Assignee: Robert Bosch GmbH, Stuttgart (DE)

( * ) Notice: Subject to any disclaimer, the term of this patent is extended or adjusted under 35 U.S.C. 154(b) by 204 days.

(21) Appl. No.: 15/182,344

(22) Filed: Jun. 14, 2016

(65) Prior Publication Data

US 2016/0370402 A1 Dec. 22, 2016

(30) Foreign Application Priority Data

Jun. 19, 2015 (DE) .................. 10 2015 211 387

(51) Int. Cl.
  *G01P 15/18* (2013.01)
  *G01P 15/08* (2006.01)
(52) U.S. Cl.
  CPC .......... *G01P 15/18* (2013.01); *G01P 15/0802* (2013.01); *G01P 15/0888* (2013.01)
(58) Field of Classification Search
  CPC .... G01P 15/18; G01P 15/125; G01P 15/0888; G01P 15/0802; G01C 19/5712; G01C 19/5719
  USPC ...................................................... 73/514.32
  See application file for complete search history.

(56) References Cited

U.S. PATENT DOCUMENTS

| | | | |
|---|---|---|---|
| 5,249,465 A * | 10/1993 | Bennett | G01P 15/131 73/510 |
| 5,251,484 A * | 10/1993 | Mastache | G01P 15/0888 73/514.02 |
| 5,487,305 A * | 1/1996 | Ristic | G01P 15/125 73/514.18 |
| 5,806,365 A * | 9/1998 | Zunino | G01P 15/0802 73/504.03 |
| 6,158,280 A * | 12/2000 | Nonomura | G01C 19/5719 73/504.04 |
| 6,257,062 B1 * | 7/2001 | Rich | G01P 15/0888 73/514.32 |

(Continued)

FOREIGN PATENT DOCUMENTS

| | | |
|---|---|---|
| CN | 101216308 A | 7/2008 |
| CN | 101216311 A | 7/2008 |

(Continued)

*Primary Examiner* — Helen C Kwok

(74) *Attorney, Agent, or Firm* — Norton Rose Fulbright US LLP; Gerard Messina

(57) ABSTRACT

A rotational acceleration sensor having a substrate, a mass movable with respect to the substrate, a suspension means suspending the mass movably relative to the substrate, a detection means for detecting a state of the mass deflected with respect to an idle position, and a detection means encompassing a first detection unit for detecting a deflected state of the mass i.e., a pivoting of the mass around a first axis substantially perpendicular to a principal extension plane of the substrate as a result of a rotational acceleration of the rotational acceleration sensor around the first axis. The detection means also encompassing a second detection unit for detecting a deflected state of the mass, i.e., a pivoting of the mass around a second axis substantially parallel to the principal extension plane of the substrate as a result of a rotational acceleration of the rotational acceleration sensor around the second axis.

9 Claims, 4 Drawing Sheets

(56) References Cited

U.S. PATENT DOCUMENTS

| | | | |
|---|---|---|---|
| 6,401,536 B1* | 6/2002 | O'Brien | G01P 15/0888 73/514.11 |
| 6,841,992 B2* | 1/2005 | Yue | G01P 15/125 324/162 |
| 8,307,707 B2* | 11/2012 | Kohn | G01C 19/5712 73/504.12 |
| 8,549,921 B2* | 10/2013 | Schwarzelbach | G01P 15/0802 73/514.32 |
| 2009/0064780 A1* | 3/2009 | Coronato | G01C 19/5712 73/504.08 |
| 2009/0183570 A1* | 7/2009 | Acar | G01P 15/125 73/514.32 |
| 2010/0126269 A1* | 5/2010 | Coronato | G01C 19/5712 73/504.04 |
| 2011/0154899 A1* | 6/2011 | Classen | G01P 15/125 73/514.32 |
| 2013/0192369 A1* | 8/2013 | Acar | G01C 19/5712 73/514.01 |
| 2013/0247666 A1* | 9/2013 | Acar | G01C 19/5755 73/514.01 |
| 2014/0144235 A1* | 5/2014 | Suzuki | G01P 15/125 73/514.32 |
| 2016/0097792 A1* | 4/2016 | Naumann | G01P 15/18 73/504.02 |

FOREIGN PATENT DOCUMENTS

| | | |
|---|---|---|
| CN | 101216500 A | 7/2008 |
| CN | 101920927 A | 12/2010 |
| DE | 19938206 | 2/2001 |
| EP | 0786645 A2 | 7/1997 |

\* cited by examiner

THREE-AXIS ROTATIONAL ACCELERATION SENSOR

CROSS REFERENCE

The present application claims the benefit under 35 U.S.C. § 119 of German Patent Application No. DE 102015211387.6 filed on Jun. 19, 2015, which is expressly incorporated herein by reference in its entirety.

BACKGROUND INFORMATION

The present invention relates to a micromechanical rotational acceleration sensor having a substrate and having a mass movable with respect to the substrate, and having a suspension means suspending the mass movably relative to the substrate, the rotational acceleration sensor having a detection means for detecting a state of the mass deflected with respect to an idle position, the detection means encompassing a first detection unit for detecting a deflected state of the mass in the sense of a pivoting of the mass around a first axis substantially perpendicular to a principal extension plane of the substrate as a result of a rotational acceleration of the rotational acceleration sensor around the first axis.

Conventional rotational acceleration sensors are common. German Patent Application No. DE 199 38 206 A1, for example, describes a rotational acceleration sensor for detecting a rotational acceleration of the rotational acceleration sensor around an axis perpendicular to the principal extension plane of the substrate.

A rotational acceleration sensor whose detection means encompasses, in addition to a first detection means as described above, a second detection unit for detecting a deflected state of the mass in the sense of a pivoting of the mass around a second axis substantially parallel to the principal extension plane of the substrate as a result of a rotational acceleration of the rotational acceleration sensor around the second axis is not, however, disclosed.

SUMMARY

A rotational acceleration sensor in accordance with an example embodiment of the present invention may have the advantage that the detection means of the rotational acceleration sensor according to the present invention encompasses a second detection unit for detecting a deflected state of the mass in the sense of a pivoting of the mass around a second axis substantially parallel to the principal extension plane of the substrate as a result of a rotational acceleration of the rotational acceleration sensor around the second axis. A rotational acceleration sensor for detecting rotational accelerations along two axes proceeding perpendicularly to one another can thereby be implemented with the aid of a micromechanical structure in a compact, mechanically robust, and inexpensive manner. An enhancement for detecting rotational accelerations along three axes proceeding perpendicularly to one another can also be implemented in a compact, mechanically robust, and inexpensive manner.

Advantageous embodiments and refinements of the present invention may be gathered from the description below with reference to the figures.

According to a preferred refinement, provision is made that the detection means encompasses a third detection unit for detecting a deflected state of the mass in the sense of a pivoting of the mass around a third axis substantially parallel to the principal extension plane and substantially perpendicular to the second axis as a result of a rotational acceleration of the rotational acceleration sensor around the third axis. A rotational acceleration sensor for detecting rotational accelerations along three axes proceeding perpendicularly to one another can thereby be implemented with the aid of a micromechanical structure in a compact, mechanically robust, and inexpensive manner.

According to a preferred refinement, provision is made that the mass is embodied as an annular disk, the annular disk extending in the idle position substantially in a plane substantially parallel to the principal extension plane, the rotational acceleration sensor having in the region of the center point of the annular disk a substrate-mounted anchor point, the annular disk being connected via the suspension means to the anchor point. Advantageously, a rotational acceleration sensor for detecting a rotational acceleration around an axis and/or around two axes proceeding perpendicularly to one another and/or three axes proceeding perpendicularly to one another is thus implemented.

According to a preferred refinement, provision is made that the suspension means encompasses at least one spring, in particular a torsion spring and/or a flexural spring, the number of springs being greater than 2, in particular 3, 4, 5, 6, 7, 8, 9, 10, the springs respectively being connected via the anchor point to the substrate. What is advantageously achieved thereby is that the mass or the annular disk is suspended movably relative to the substrate. In particular, the mass or the annular disk can be pivoted around the first axis and/or around the second axis and/or around the third axis. A number of springs greater than 2 makes the rotational acceleration sensor particularly robust with regard to the detection of linear accelerations. Such robustness furthermore increases with an increasing number of springs. The fact that the springs are respectively connected via the anchor point to the substrate allows implementation of a compact and inexpensive rotational acceleration sensor.

According to a preferred refinement, provision is made that the first detection unit encompasses at least one first electrode, the first electrode being embodied in substantially plate-shaped fashion, the first electrode extending substantially perpendicularly to the principal extension plane, the first electrode extending substantially along a radial line of the annular disk which emerges from the anchor point and proceeds parallel to the principal extension plane, the first electrode being disposed on the substrate in such a way that it projects at least in part into a recess of the annular disk, in particular at least two first electrodes being disposed substantially along an oppositely located radial line and substantially at the same distance from the first axis or from the anchor point. It is thus advantageously possible to detect a deflected state of the mass or of the circular disk with respect to an idle position, in the sense of a pivoting respectively of the mass or of the circular disk around a first axis substantially perpendicular to a principal extension plane of the substrate as a result of a rotational acceleration of the rotational acceleration sensor around the first axis.

According to a preferred refinement, provision is made that the second detection unit encompasses at least one second electrode, the second electrode being embodied in substantially plate-shaped fashion, the second electrode extending substantially parallel to the principal extension plane and being disposed at least in part between the substrate and the mass, at least two second electrodes being disposed substantially along the third axis and substantially at the same distance from the first axis or from the anchor point. A deflected state respectively of the mass or of the circular disk with respect to an idle position, in the sense of a pivoting respectively of the mass or of the circular disk around a second axis substantially parallel to the principal extension plane of the substrate as a result of a rotational acceleration of the rotational acceleration sensor around the second axis, can thereby advantageously be detected.

According to a preferred refinement, provision is made that the third detection unit encompasses at least one third electrode, the third electrode being embodied in substantially plate-shaped fashion, the third electrode extending substantially parallel to the principal extension plane and being disposed at least in part between the substrate and the mass, at least two third electrodes being disposed substantially along the second axis and substantially at the same distance from the first axis or from the anchor point. A deflected state respectively of the mass or of the circular disk with respect to an idle position, in the sense of a pivoting respectively of the mass or of the circular disk around a third axis substantially parallel to the principal extension plane and substantially perpendicular to the second axis as a result of a rotational acceleration of the rotational acceleration sensor around the third axis, can thereby advantageously be detected.

According to a preferred refinement, provision is made that the second detection unit encompasses at least one fourth electrode, the fourth electrode being embodied in substantially plate-shaped fashion, the fourth electrode extending substantially parallel to the principal extension plane and being disposed on a side of the mass located opposite the second electrode and facing away from the substrate, at least two fourth electrodes being disposed substantially along the third axis and substantially at the same distance from the first axis or from the anchor point, and on opposite sides of the first axis or of the anchor point. It is thereby advantageously possible to detect a deflected state respectively of the mass or of the circular disk, in the sense of a pivoting respectively of the mass or of the circular disk around the second axis as a result of a rotational acceleration of the rotational acceleration sensor around the second axis. A differential evaluation is, in particular, thus advantageously possible.

According to a preferred refinement, provision is made that the third detection unit encompasses at least one fifth electrode, the fifth electrode being embodied in substantially plate-shaped fashion, the fifth electrode extending substantially parallel to the principal extension plane and being disposed on a side of the mass located opposite the third electrode and facing away from the substrate, at least two fifth electrodes being disposed substantially along the second axis and substantially at the same distance from the first axis or from the anchor point, and on opposite sides respectively of the first axis and of the anchor point. It is thereby advantageously possible to detect a deflected state respectively of the mass or of the circular disk, in the sense of a pivoting respectively of the mass or of the circular disk around the third axis as a result of a rotational acceleration of the rotational acceleration sensor around the third axis. A differential evaluation is, in particular, thus advantageously possible.

According to a preferred refinement, provision is made that the rotational acceleration sensor encompasses a holder for holding the fourth electrode and/or the fifth electrode, the holder being fastened via the anchor point to the substrate. A rotational acceleration sensor for detecting rotational accelerations along one and/or two and/or three axes proceeding perpendicularly to one another, including differential evaluation, can thereby be implemented in a compact, mechanically robust, and inexpensive manner.

DETAILED DESCRIPTION OF EXAMPLE EMBODIMENTS

Figure 1:
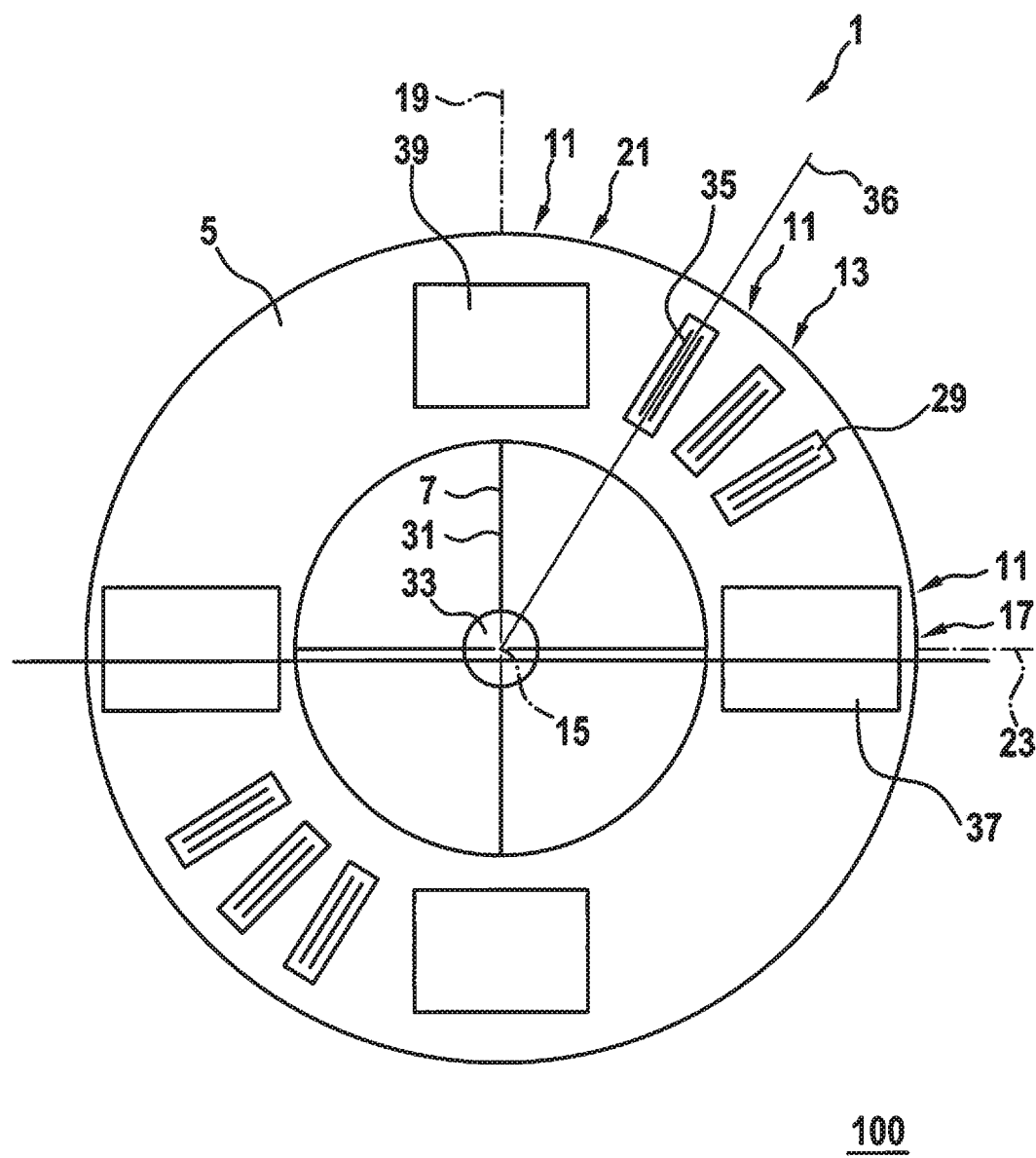
FIG. 1 is a schematically depicted plan view of a rotational acceleration sensor according to an exemplifying embodiment of the present invention.

In the various Figures, identical parts are always labeled with identical reference characters and are therefore also, generally, each named or mentioned only once.

FIG. 1 schematically depicts a rotational acceleration sensor 1 according to an exemplifying embodiment of the present invention. Rotation rate sensor 1 has a substrate 3, depicted in FIG. 2, having a principal extension plane 100, a movable mass 5, a suspension means 7, and a detection means 11.

Mass 5 depicted by way of example in FIG. 1 is embodied as an annular disk 5. In the idle position annular disk 5 is located substantially in a plane substantially parallel to principal extension plane 100. The geometry of mass 5 is of course not limited in this context to an annular disk 5. Mass 5 is embodied, for example, as a frame-like panel, a circular disk, a tetrahedron, and/or another three-dimensional shape. Rotational acceleration sensor 1 has a substrate-mounted anchor point 33 at the center point of annular disk 5 that is depicted by way of example, annular disk 5 being connected via suspension means 7 to anchor point 33. It is also possible for rotational acceleration sensor 1 to have more than one substrate-mounted anchor point 33. For example, rotational acceleration sensor 1 has, additionally or alternatively to substrate-mounted anchor point 33 depicted here, further substrate-mounted anchor points 33 in the region of the center point of annular disk 5, and/or also further substrate-mounted anchor points 33 in the radially outwardly directed region of annular disk 5. Annular disk 5 furthermore has six recesses 29 respectively for the reception of two first electrodes 35 of a first detection unit 13. With the aid of the disposition respectively of two first electrodes 35 inside each of the six recesses 29, it is advantageously possible to implement detection of rotational accelerations around a first axis 15, including differential evaluation.

Suspension means 7 depicted by way of example in FIG. 1 has four springs 31 that are connected to annular disk 5 and, via anchor point 33, to substrate 3. Springs 31 depicted here are embodied to be soft with regard to a torsional motion and soft with regard to a flexural motion. Alternative suspension means, for example springs 31 in the radially outwardly directed region of annular disk 5, are also conceivable in alternative exemplifying embodiments.

Detection means 11 depicted by way of example in FIG. 1 encompasses a first detection unit 13, a second detection unit 17, and an exemplifying third detection unit 21.

First detection unit 13 of the exemplifying embodiment depicted here encompasses twelve first electrodes 35 that are embodied in substantially plate-shaped fashion and extend perpendicularly to principal extension plane 100 and in star-shaped fashion in a radial direction of annular disk 5. Each two first electrodes 35 project into one of six recesses 29 of annular disk 5. It is also possible, for example, for first electrodes 35 to be disposed in the radially inwardly located region and/or in the radially outwardly located region of annular disk 5. It is possible in this connection, for example, for the electrodes to interact with a comb-like structure of annular disk 5 for detection.

In the exemplifying embodiment depicted here, second detection unit 17 and third detection unit 21 preferably are embodied identically but are disposed with a right-angle rotation with respect to one another around anchor point 33. Second detection unit 17 encompasses two second electrodes 37, embodied in plate-shaped fashion, that are disposed substantially parallel to principal extension direction 100 and at least in part between substrate 3 and mass 5. The two second electrodes 37 are disposed substantially at the same distance from anchor point 33 along third axis 23. Third detection unit 21 encompasses two third electrodes 39, embodied in plate-shaped fashion, that are disposed substantially parallel to principal extension plane 100 and at least in part between substrate 3 and mass 5. The two third electrodes 39 are disposed substantially at the same distance from anchor point 33 along second axis 19.

The manner of operation of rotational acceleration sensor 1 depicted by way of example in FIG. 1 is as follows: If a rotational acceleration of rotational acceleration sensor 1 around first axis 15 exists, mass 5 is then deflected out of the state depicted in FIG. 1 in the sense of a pivoting of mass 5 around first axis 15. This deflection is sensed by first detection unit 13. If a rotational acceleration of rotational acceleration sensor 1 around second axis 19 exists, mass 5 is then deflected out of the state depicted in FIG. 1 in the sense of a pivoting of mass 5 around second axis 19. This deflection is sensed by second detection unit 17. If a rotational acceleration of rotational acceleration sensor 1 around third axis 23 exists, mass 5 is then deflected out of the state depicted in FIG. 1 in the sense of a pivoting of mass 5 around third axis 23. This deflection is sensed by third detection unit 21.

Figure 2:
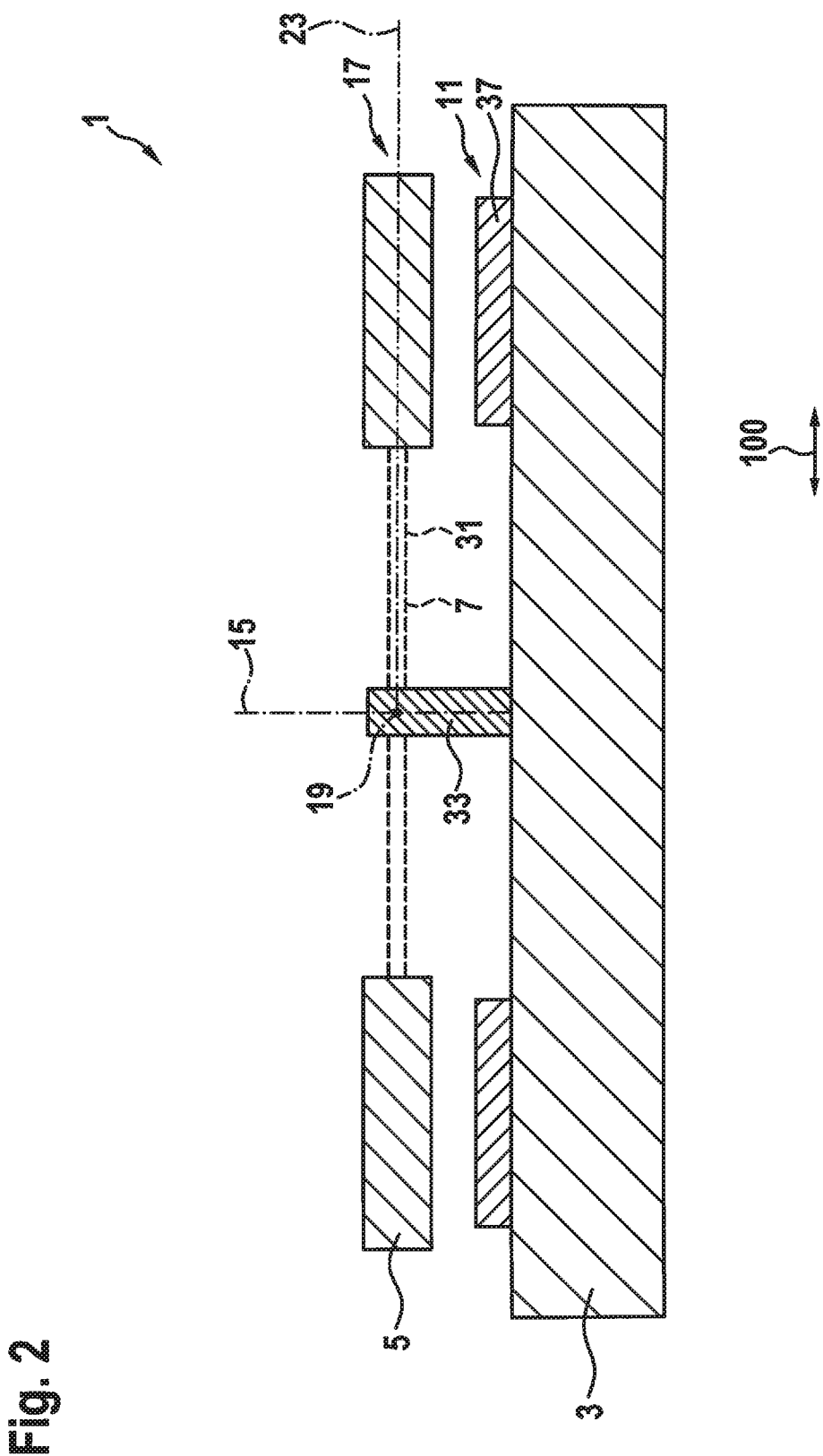
FIG. 2 is a schematically depicted sectioned view of a rotational acceleration sensor according to FIG. 1.

FIG. 2 depicts a rotational acceleration sensor 1 in a sectioned view of a rotational acceleration sensor according to FIG. 1. Substrate 3, anchor point 33, the two second electrodes 37, and annular disk 5 are depicted in FIG. 2.

Figure 3:
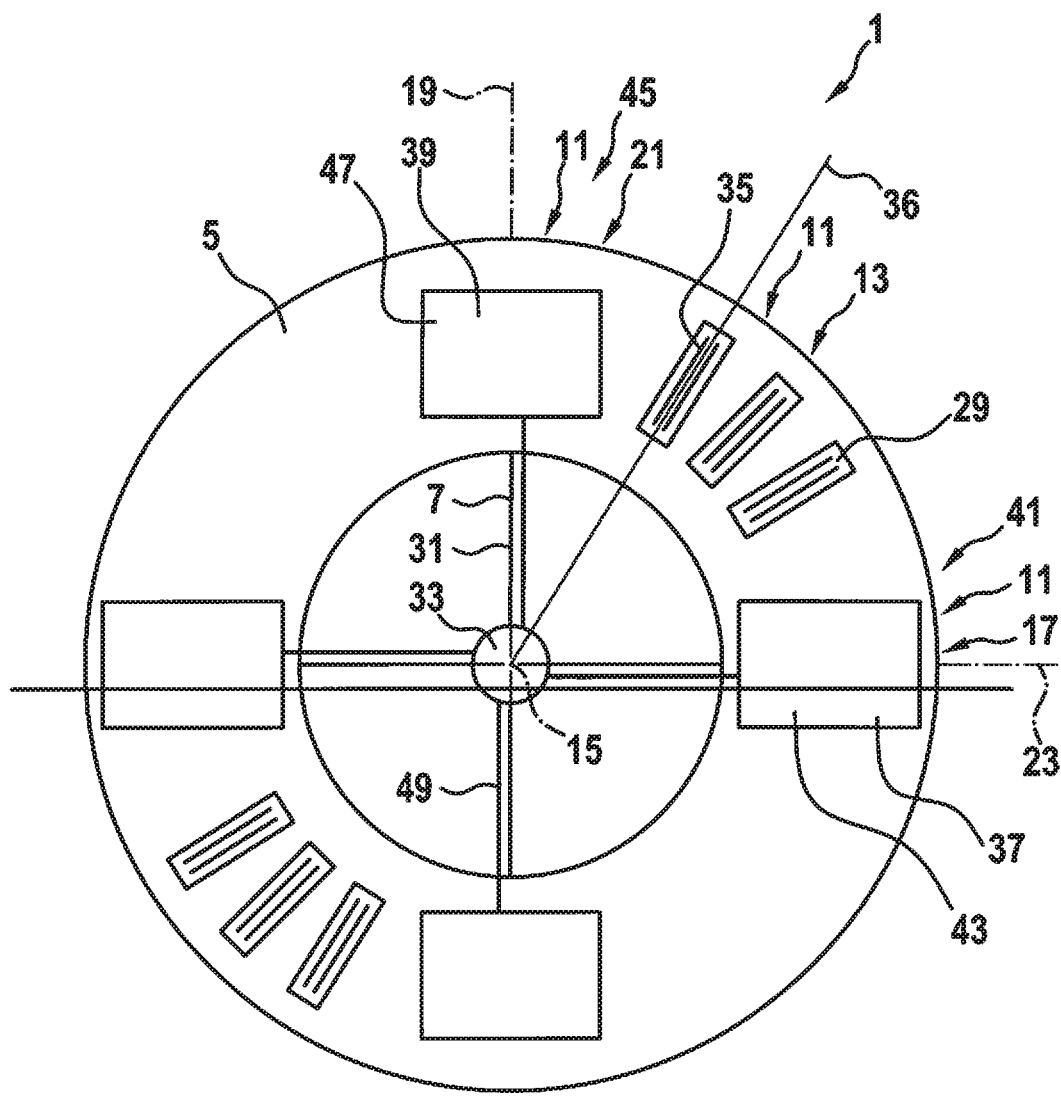
FIG. 3 is a schematically depicted plan view of a rotational acceleration sensor according to a further exemplifying embodiment of the present invention.

FIG. 3 schematically depicts a plan view of a rotational acceleration sensor according to a further exemplifying embodiment of the present invention. In this exemplifying embodiment second detection unit 17 encompasses in addition to two second electrodes 37 two fourth electrodes 43. The two fourth electrodes 43 are embodied here in substantially plate-shaped fashion and extend substantially parallel to principal extension plane 100, and are disposed on a side of mass 5 located oppositely to second electrodes 37. Just as second detection unit 17 encompasses additional fourth electrodes 43 on the side of mass 5 facing away from substrate 3, third detection unit 21 also has two fifth electrodes 47 on the side of mass 5 facing away from substrate 3. Fifth electrodes 47 are embodied similarly to fourth electrodes 43. Fifth electrodes 47 are furthermore disposed with respect to third electrodes 39 in a manner similar to the disposition of fourth electrodes 43 with respect to second electrodes 37. Also depicted in FIG. 3 is a holder 49, fastened via anchor point 33 to substrate 3, for holding the two fourth electrodes 43 and the two fifth electrodes 47. Holder 49 depicted here is embodied to be mechanically robust and stiff with respect to rotational accelerations.

Figure 4:
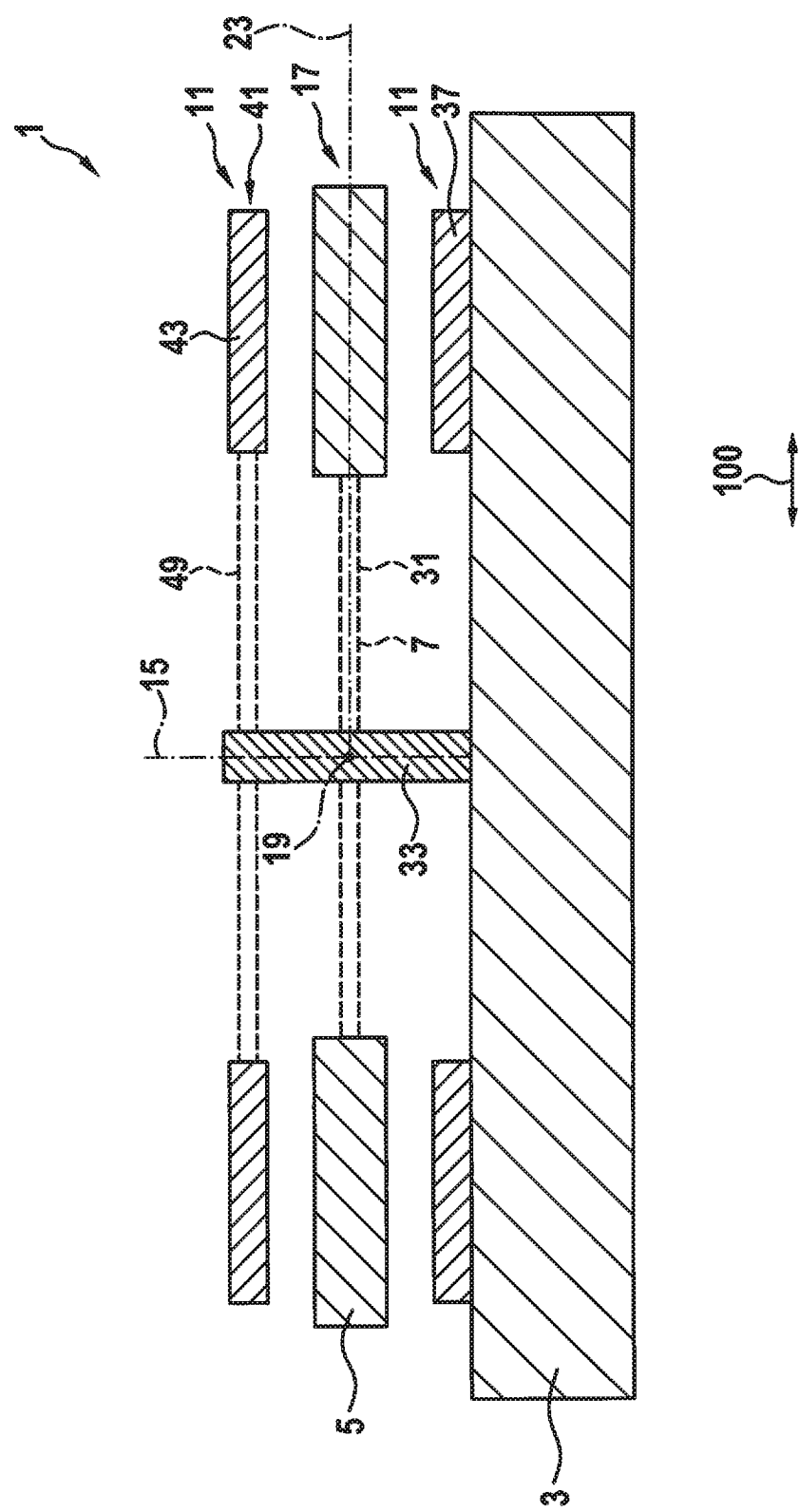
FIG. 4 is a schematically depicted sectioned view of a rotational acceleration sensor according to FIG. 3.

FIG. 4 depicts in a sectioned view a rotational acceleration sensor 1 according to FIG. 3. The relative position of the two second electrodes 37 and the two fourth electrodes 43 with respect to mass 5 is particularly evident here.

What is claimed is:

1. A rotational acceleration sensor, comprising:
a substrate;
a mass configured for moving with respect to the substrate;
a suspension device configured for suspending the mass movably relative to the substrate; and
a detector configured for detecting a state of the mass deflected with respect to an idle position, the detector including:
a first detection unit configured to detect a first pivoting of the mass around a first axis as a result of a rotational acceleration of the rotational acceleration sensor around the first axis; and
a second detection unit configured to detect a second pivoting of the mass around a second axis as a result of the rotational acceleration of the rotational acceleration sensor around the second axis,
wherein the first axis is perpendicular to a principal extension plane of the substrate, and the second axis is parallel to the principal extension plane of the substrate,
wherein the mass is embodied as an annular disk, the annular disk extending in the idle position in a plane parallel to the principal extension plane, the rotational acceleration sensor having, in a region of the center point of the annular disk, a substrate-mounted anchor point, the annular disk being connected via the suspension device to the anchor point,
wherein the first detection unit includes at least one first electrode, wherein the at least one first electrode is plate-shaped, the at least one first electrode extending perpendicularly to the principal extension plane, the at least one first electrode extending in a radial direction of the annular disk which emerges from the anchor point and proceeds parallel to the principal extension plane and within a region of the annular disk, the at least one first electrode being disposed on the substrate in such a way that it projects at least in part into a recess of the annular disk.

2. The rotational acceleration sensor as recited in claim 1, wherein the detector further includes a third detection unit configured to detect a third pivoting of the mass around a third axis as a result of the rotational acceleration of the rotational acceleration sensor around the third axis, wherein the third axis is parallel to the principal extension plane and perpendicular to the second axis.

3. The rotational acceleration sensor as recited in claim 1, wherein the suspension device includes at least two springs, each of the springs being at least one of a torsion spring and a flexural spring, the springs respectively being connected via the anchor point to the substrate.

4. The rotational acceleration sensor as recited in claim 1, wherein the at least one first electrode includes at least two first electrodes disposed opposite a radial line and at a same distance from the first axis.

5. The rotational acceleration sensor as recited in claim 1, wherein the second detection unit includes at least one second electrode, the at least one second electrode is plate-shaped, the at least one second electrode extending parallel to the principal extension plane and being disposed at least in part between the substrate and the mass, the at least one second electrode including at least two second electrodes disposed in a direction of the third axis and at a same distance from the first axis.

6. The rotational acceleration sensor as recited in claim 5, wherein the third detection unit includes at least one third electrode, the at least one third electrode is plate-shaped, the at least one third electrode extending parallel to the principal extension plane and being disposed at least in part between the substrate and the mass, wherein the at least one third electrode includes at least two third electrodes disposed in a direction of the second axis and at the same distance from the first axis.

7. The rotational acceleration sensor as recited in claim 6, wherein the second detection unit includes at least one fourth electrode, the at least one fourth electrode is plate-shaped, the at least one fourth electrode extending parallel to the principal extension plane and being disposed on a side of the mass located opposite the second electrode and facing away from the substrate, the at least one fourth electrode including at least two fourth electrodes disposed in a direction of the third axis and at a same distance from the first axis and on opposite sides of the first axis.

8. The rotational acceleration sensor as recited in claim 7, wherein the third detection unit includes at least one fifth electrode, the at least one fifth electrode is plate-shaped, the at least one fifth electrode extending parallel to the principal extension plane and being disposed on a side of the mass located opposite the third electrode and facing away from the substrate, the at least one fifth electrode including at least two fifth electrodes disposed in a direction of the second axis and at a same distance from the first axis and on opposite sides of the first axis.

9. The rotational acceleration sensor as recited in claim 8, further comprising:
   a holder configured for holding at least one of the at least one fourth electrode and the at least one fifth electrode, the holder being fastened via the anchor point to the substrate.

\* \* \* \* \*